United States Patent
Nanba

(10) Patent No.: US 8,210,947 B2
(45) Date of Patent: Jul. 3, 2012

(54) GAME SYSTEM USING NETWORK, GAME PROGRAM, GAME DEVICE, AND METHOD FOR CONTROLLING GAME USING NETWORK

(75) Inventor: Kazuhiro Nanba, Hyogo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 112 days.

(21) Appl. No.: 12/954,335

(22) Filed: Nov. 24, 2010

(65) Prior Publication Data

US 2011/0070952 A1 Mar. 24, 2011

Related U.S. Application Data

(63) Continuation of application No. PCT/JP2009/057850, filed on Apr. 20, 2009.

(30) Foreign Application Priority Data

Jun. 2, 2008 (JP) ................................. 2008-144664

(51) Int. Cl.
G06F 17/00 (2006.01)
(52) U.S. Cl. ............................... 463/42; 463/40; 463/41
(58) Field of Classification Search ............... 463/40–42
See application file for complete search history.

(56) References Cited

U.S. PATENT DOCUMENTS

| | | | | |
|---|---|---|---|---|
| 6,415,203 | B1 * | 7/2002 | Inoue et al. | 700/245 |
| 7,010,492 | B1 * | 3/2006 | Bassett et al. | 705/14.1 |
| 7,487,449 | B2 * | 2/2009 | Mizuta | 715/700 |
| 7,590,992 | B2 * | 9/2009 | Koplar et al. | 725/23 |
| 7,740,532 | B2 * | 6/2010 | Namba et al. | 463/4 |
| 7,853,122 | B2 * | 12/2010 | Miura et al. | 386/248 |
| 2001/0027130 | A1 * | 10/2001 | Namba et al. | 463/42 |
| 2001/0041047 | A1 * | 11/2001 | Kawajiri | 386/46 |
| 2002/0016195 | A1 * | 2/2002 | Namba et al. | 463/3 |
| 2002/0183115 | A1 * | 12/2002 | Takahashi et al. | 463/42 |
| 2003/0182402 | A1 * | 9/2003 | Goodman et al. | 709/220 |
| 2004/0013398 | A1 * | 1/2004 | Miura et al. | 386/46 |
| 2005/0070357 | A1 * | 3/2005 | Namba et al. | 463/36 |
| 2005/0159958 | A1 * | 7/2005 | Yoshimura | 704/276 |
| 2005/0222802 | A1 | 10/2005 | Tamura et al. | |
| 2006/0031496 | A1 * | 2/2006 | Suzuki | 709/225 |
| 2007/0113250 | A1 * | 5/2007 | Logan et al. | 725/46 |
| 2008/0266250 | A1 * | 10/2008 | Jacob | 345/156 |
| 2010/0138775 | A1 * | 6/2010 | Kohen et al. | 715/781 |

FOREIGN PATENT DOCUMENTS

JP 08-255149 A 10/1996
(Continued)

*Primary Examiner* — Michael Cuff
(74) *Attorney, Agent, or Firm* — Global IP Counselors, LLP

(57) ABSTRACT

A game system for a game is provided with a server and a data transceiver apparatus. The data transceiver apparatus is configured to report execution of the game to the server, and includes a motion sensor and an image display unit to display the game. The server is configured to transmit event data for executing an event of the game to the data transceiver apparatus. The data transceiver apparatus is configured to execute based on the event data, and to generate motion data, which indicates how a user moves the data transceiver apparatus. At least one of the data transceiver apparatus and the server is configured to generate excitement level data which indicates excitement level of the user. The server is configured to generate statistic of the excitement level data. The data transceiver apparatus is configured to receive the statistic from the server and display the statistic.

9 Claims, 10 Drawing Sheets

FOREIGN PATENT DOCUMENTS

| | | |
|---|---|---|
| JP | 2002-056150 A | 2/2002 |
| JP | 2003-249983 A | 9/2003 |
| JP | 2006-202251 A | 8/2006 |
| JP | 2007-258885 A | 10/2007 |
| JP | 2007-304988 A | 11/2007 |
| WO | WO-2004/020951 A1 | 3/2004 |

* cited by examiner

| EVENT ELEMENTS | ELEMENT DATA | EVENT DATA |
|---|---|---|
| SCORE OF TEAM A (a) <br> SCORE OF TEAM B (b) | a * <br> *b | SITUATION OF SCORES |
| RUNNER ON FIRST BASE <br> RUNNER ON SECOND BASE <br> RUNNER ON THIRD BASE | 1 * * <br> *1 * <br> * *1 | SITUATION OF RUNNERS ON BASES |
| NUMBER OF STRIKES (ns) <br> NUMBER OF BALLS (nb) | ns * <br> *nb | SITUATION OF COUNT |
| SINGLE HIT (EDS1-1) <br> DOUBLE HIT (EDS1-2) <br> TRIPLE HIT (EDS1-3) <br> HOMER (EDS1-4) | 1 <br> 2 <br> 3 <br> 4 | SITUATION OF PLAY |

FIG. 4

| FREQUENCY OF SHAKING OF MOBILE PHONE (n) | EXCITEMENT LEVEL | EXCITEMENT LEVEL DATA |
| --- | --- | --- |
| N ≧ 100 | HIGHEST | 1 |
| 80 ≦ N < 100 | HIGH | 2 |
| 50 ≦ N < 80 | NORMAL | 3 |
| 20 ≦ N < 50 | LOW | 4 |
| 0 ≦ N < 20 | LOWEST | 5 |

FIG. 7

GAME SYSTEM USING NETWORK, GAME PROGRAM, GAME DEVICE, AND METHOD FOR CONTROLLING GAME USING NETWORK

CROSS-REFERENCE TO RELATED APPLICATIONS

This application is a continuation application of International Application No. PCT/JP2009/057850 filed on Apr. 20, 2009, which claims priority to Japanese Patent Application No. 2008-144664 filed on Jun. 2, 2008. The entire disclosures of the International Application No. PCT/JP2009/057850 and Japanese Patent Application No. 2008-144664 are hereby incorporated herein by reference.

BACKGROUND OF THE INVENTION

1. Field of the Invention

The present invention relates to a game system using a network, and particularly to a game system using a network configured to allow a data transceiver apparatus embedded with a motion sensor to execute a network game when the data transceiver apparatus is connected to a server.

Further, the present invention relates to a game program configure to be executed in a game system using a network, a game apparatus forming a game system, and a game controlling method configured to be used in a game system using a network.

2. Background Art

A variety of network games have been proposed so far. Examples of the network games are: a network game of a type configured to be executed by a stand-alone apparatus; and a network game of a type configured to be executed by a single or plurality of apparatuses connected to a server. In the game of the latter type (i.e., the network game), for instance, a game player is allowed to play the game when connecting his/her own game apparatus to a computer functioning as a server via a network. Alternatively, two game players are allowed to execute a match-up game when connecting their game apparatuses to the computer functioning as a server via the network. For example, the baseball video games are known as a type of games allowing game players to play a match-up game via a network as described above. Pro Yakyu Spirit 3, software for PlayStation®3 on sale on Apr. 1, 2007 by Konami Digital Entertainment, Inc. discloses such baseball video game, for example.

For example, the well-known baseball video games, which allow two game players to play a match-up game, are of a type that a game player manipulates baseball player characters of his/her selected baseball team and competes to get higher scores with an opponent baseball team directed by the other game player. However, the game makers have proposed the baseball video games of new types and new modes in the baseball video games, in addition to the baseball video games of the well-known types, with achievement in high performance game apparatuses and development in the network environment in recent years.

One of the games or game modes herein proposed (hereinafter simply referred to as "game") is of a type configured to reproduce a baseball match of the real world in a game space using data of the baseball match of the real world. In this case, game players or audience are configured to watch a reproduced baseball match displayed on monitors. In the video game, data of the baseball match of the real world is firstly stored in a server. Next, the data is distributed from the server to game apparatuses. Baseball player characters, who are disposed in the game space, are caused to perform actions corresponding to the data for reproducing the baseball match of the real world in the game space. The reproduced situation is then displayed on the monitors of the game apparatuses.

In the video game of the aforementioned type, the data of the baseball match of the real world is configured to be distributed from the server to the game apparatuses after being organized as needed. Accordingly, the game apparatuses are respectively allowed to reproduce a situation of the baseball match of the real world with a relatively small volume of data.

SUMMARY

In the video game of the aforementioned type, however, the data of the baseball match of the real world (i.e., information) unidirectionally flows from the server to the game apparatuses. The video game of the aforementioned type has advantages in that game players can easily obtain the information, but has disadvantages in that game players get bored with the video game in a short period of time.

The present invention has been produced in view of the above drawback. The present invention addresses a need for producing a highly interesting game player participatory game configured to be executed based on data transmitted from a server.

A game system for a game is provided. The game system including a server and a data transceiver apparatus. The data transceiver apparatus is configured to report execution of the game to the server, and includes a motion sensor and an image display unit to display the game. The server is configured to transmit event data for executing an event of the game to the data transceiver apparatus when the execution of the game is reported to the server. The data transceiver apparatus is configured to execute the event of the game based on the event data, and generate motion data based on a motion of the data transceiver apparatus detected by the motion sensor during execution of the event. The motion data indicates how a user moves the data transceiver apparatus. At least one of the data transceiver apparatus and the server is configured to generate excitement level data based on the motion data. The excitement level data indicates excitement level of the user. The server is configured to generate statistic of the excitement level data. The data transceiver apparatus is configured to receive the statistic from the server and display the statistic.

BRIEF DESCRIPTION OF THE DRAWINGS

Referring now to the attached drawings which form a part of this original disclosure:

FIG. 4 is a table showing a configuration of event data;

FIG. 7 is a table for evaluating excitement levels;

DETAILED DESCRIPTION OF THE PREFERRED EMBODIMENTS

Configurations and Actions of Server and Data Transceiver Apparatus

Figure 1:
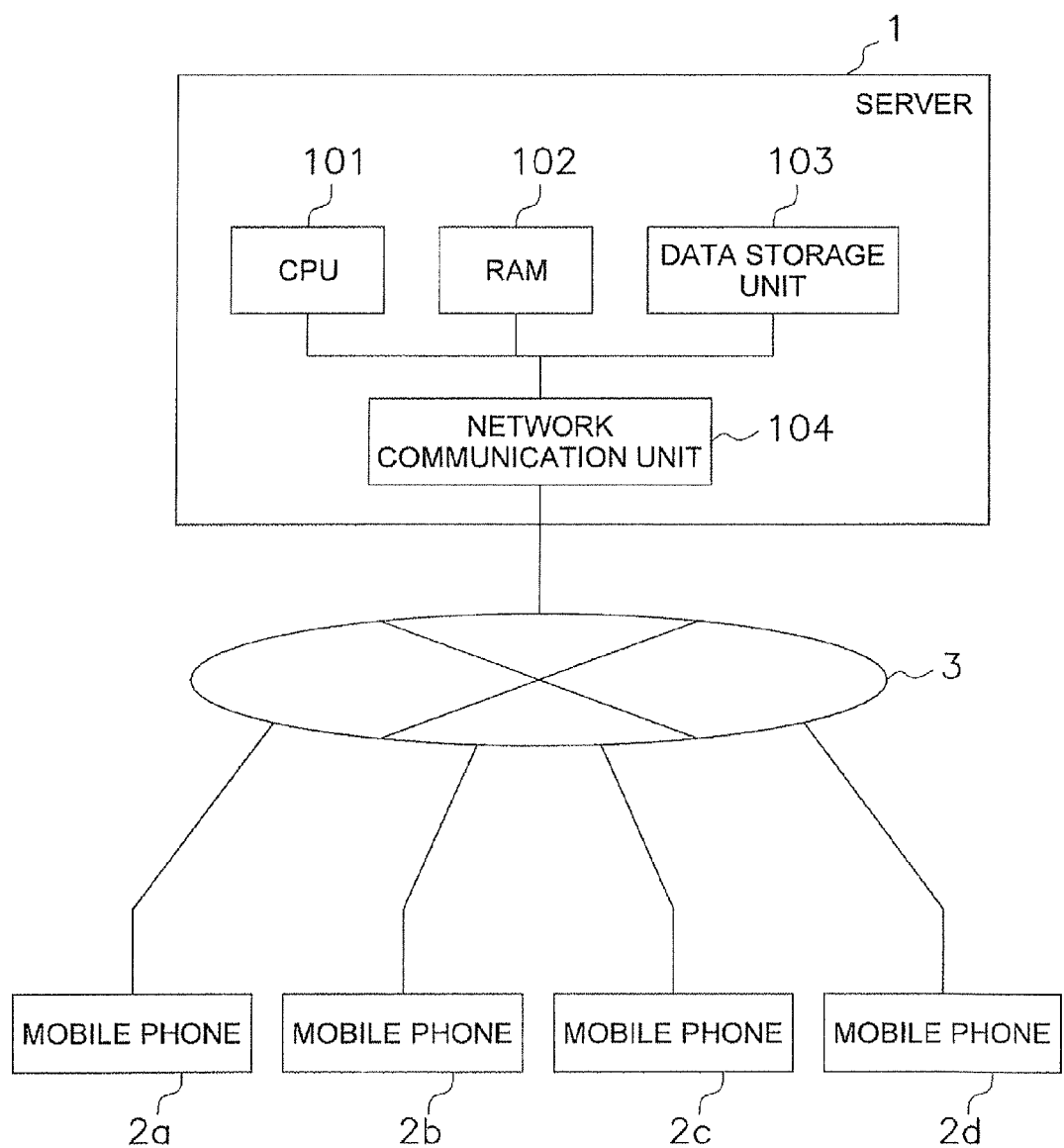
FIG. 1 is a view of an overall configuration of a video game system according to an exemplary embodiment of the present invention.

FIG. 1 is a diagram for explaining the overall configuration of a game system according to an exemplary embodiment of the present invention. The game system includes a server 1, a plurality of data transceiver apparatuses 2 (clients 2a, 2b, etc), and a communication equipment for allowing communication between the server 1 and the data transceiver apparatuses 2. In this case, the data transceiver apparatuses 2 are exemplified as mobile phones (2a, 2b, etc). The data transceiver apparatuses 2 (e.g., a plurality of mobile phones) are respectively connected to the server 1 via the communication equipment (e.g., a base station). FIG. 1 shows a communication network 3, and the communication network 3 includes the base station.

As described above, the data transceiver apparatuses 2 are herein exemplified as the mobile phones. However, the data transceiver apparatuses 2 may be any suitable apparatuses other than the mobile phones. For example, the data transceiver apparatuses 2 may be home video game apparatuses respectively including a home video game console, a game pad, and a television monitor. In this case, the home video game console includes a variety of components such as a control unit and a storage unit, whereas the game pad is embedded with a motion sensor. The game pad herein corresponds to an input unit, whereas the television monitor corresponds to an image display unit. The home video game console and the game pad are connected through wired or wireless communication.

Further, each of the data transceiver apparatuses 2 may be a personal computer including a mouse connected thereto. In this case, a main unit of each personal computer includes a variety of components such as a control unit and a storage unit. Further, the mouse is configured to detect movement of a finger or a hand of a user. The mouse can be thereby regarded to include a motion sensor. The mouse herein corresponds to an input unit, whereas a monitor of the personal computer corresponds to an image display unit. As to the mouse, frequency of clicks in a predetermined period of time can be regarded as an index for expressing an excitement level to be described. A keyboard may herein alternatively correspond to the input unit instead of the mouse. When the keyboard is used, frequency of strokes of a predetermined key (e.g., an "Enter" key) in a predetermined period of time can be regarded as the index for expressing the excitement level.

Further, FIG. 1 shows the example that the respective data transceiver apparatuses 2a, 2b, etc are connected to the server 1 via the communication equipment. Alternatively, the respective data transceiver apparatuses 2a, 2b, etc may be directly connected to the server 1 without intervention of the communication equipment.

Yet further, FIG. 1 shows the example that the respective data transceiver apparatuses 2a, 2b, etc are connected to the server 1 via the communication equipment by means of wireless communication. Alternatively, the respective data transceiver apparatuses 2a, 2b, etc may be connected to the server 1 by means of wired communication.

The server 1 is configured to execute a variety of processing based on requests and data from the mobile phones 2 and store data and results of the processing.

The server 1 mainly includes a CPU (Central Processing Unit) 101, a RAM (Random Access Memory) 102, a data storage unit 103, and a communication unit 104.

The CPU 101 is configured to read out and execute a control program stored in the data storage unit 103. The RAM 102 is configured to temporarily store a variety of data such as personal data, data to be used for processing, and data being currently processed. For example, a hard disc drive is used as the data storage unit 103. The data storage unit 103 is configured to store the control program, data transmitted thereto from the mobile phones. The communication unit 104 is configured to transmit and receive data between the mobile phones 2 via the base station.

The server 1 having the aforementioned configuration is configured to receive a variety of data such as personal data and video game data from the respective mobile phones 2. In response, the server 1 is configured to transmit a variety of video game data, which is used when the respective mobile phones 2 execute the video game, to the respective mobile phones 2.

The data transceiver apparatuses e.g., the mobile phones 2) are configured to execute the video game based on the video game data obtained from the server 1.

Figure 2:
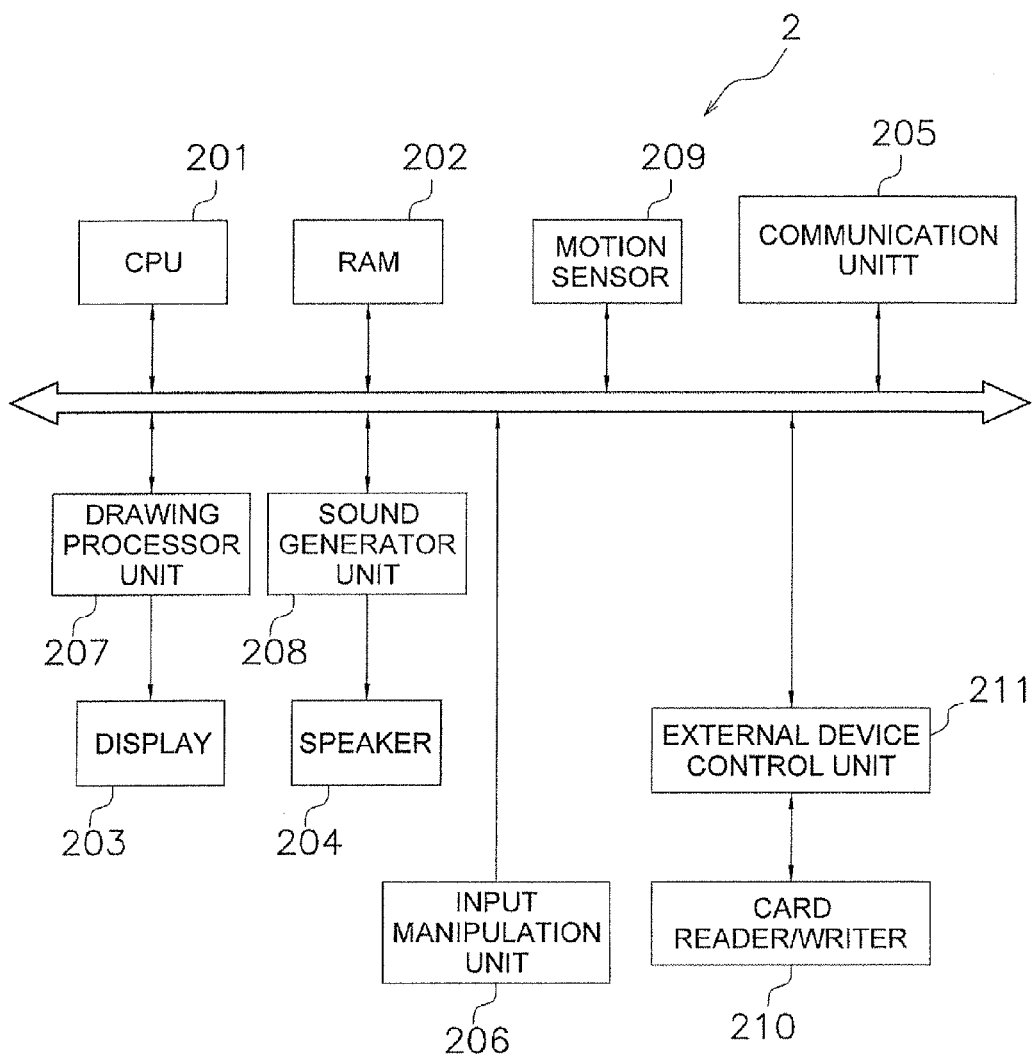
FIG. 2 is a view of hardware configuration of a mobile phone.

Each mobile phone 2 mainly includes a CPU (Central Processing unit) 201, a RAM (Random Access Memory) 202, a display 203, a speaker 204, a communication unit 205, and an input unit 206. Further, each data transceiver apparatus 2 is embedded with a motion sensor 209. Yet further, a recording medium can be attached to each data transceiver apparatus 2. The recording medium is herein configured to store the game data. FIG. 2 shows hardware configuration of each mobile phone 2.

The CPU 201 is configured to execute a program stored in the RAM 202. Further, the CPU 201 is configured to issue a variety of commands and control a variety of programs. The RAM 202 is configured to store a program, a variety of data, a variety of parameters, and the like.

The display 203 is configured to display information and images related to communication, information and images related to the video game, and the like. A drawing processor unit 207, which is embedded in each mobile phone 2, is configured to generate image data. The display 203 is configured to display information and images based on the image data. The speaker 204 is configured to output sounds related to communication, sounds related to the video game, and the like. A sound generator unit 208, which is embedded in each mobile phone 2, is configured to generate sound data. The speaker 204 is configured to output sounds based on the sound data. The RAM 202 is configured to store base image data to be used in generating the image data and the sound data.

The communication unit 205 is configured to execute a variety of processing including: a processing of transmitting data to the base station, the server 1, and the like; and a processing of receiving data from the base station, the server 1, and the like. The input unit 206 includes a plurality of keys. The input unit 206 is configured to receive an input of a game player. For example, when a key is pressed, the CPU 201 recognizes an input signal and issues a command corresponding to the input signal.

A recording medium can be attached to a card reader/writer 212. Data, extracted from the recording medium by the card reader/writer 212, is controlled by an external device control unit 211 and is supplied to the CPU 201, the RAM 202, and the like.

The motion sensor 209, which is embedded in each mobile phone 2, is herein an acceleration sensor configured to detect tri-axial acceleration. When the mobile phone 2 embedded with the motion sensor 209 is tilted or shaken upward, downward, rightward and leftward, the motion sensor 209 is configured to detect motion data (i.e., acceleration data). Based on the motion data, a variety of data is computed such as a direction in which the mobile phone 2 is tilted, and frequency that the mobile phone 2 is shaken.

Each mobile phone 2 having the aforementioned configuration is configured to execute the video game in accordance with the program stored in the RAM 202, as follows. First, when activation of the video game is instructed, the video game program stored in the RAM 202 of each mobile phone 2 is activated. Each mobile phone 2 accordingly issues a connection request and transmits the connection request to the server 1 through the communication unit 205. When authorizing the connection request, the server 1 transmits data required for the video game, stored in the data storage unit 103 of the server 1, to each mobile phone 2 through the communication unit 104 of the server 1. In response, the mobile phone 2 downloads the data required for the video game and executes the video game.

Summary of Various Processing in Game System

Figure 3:
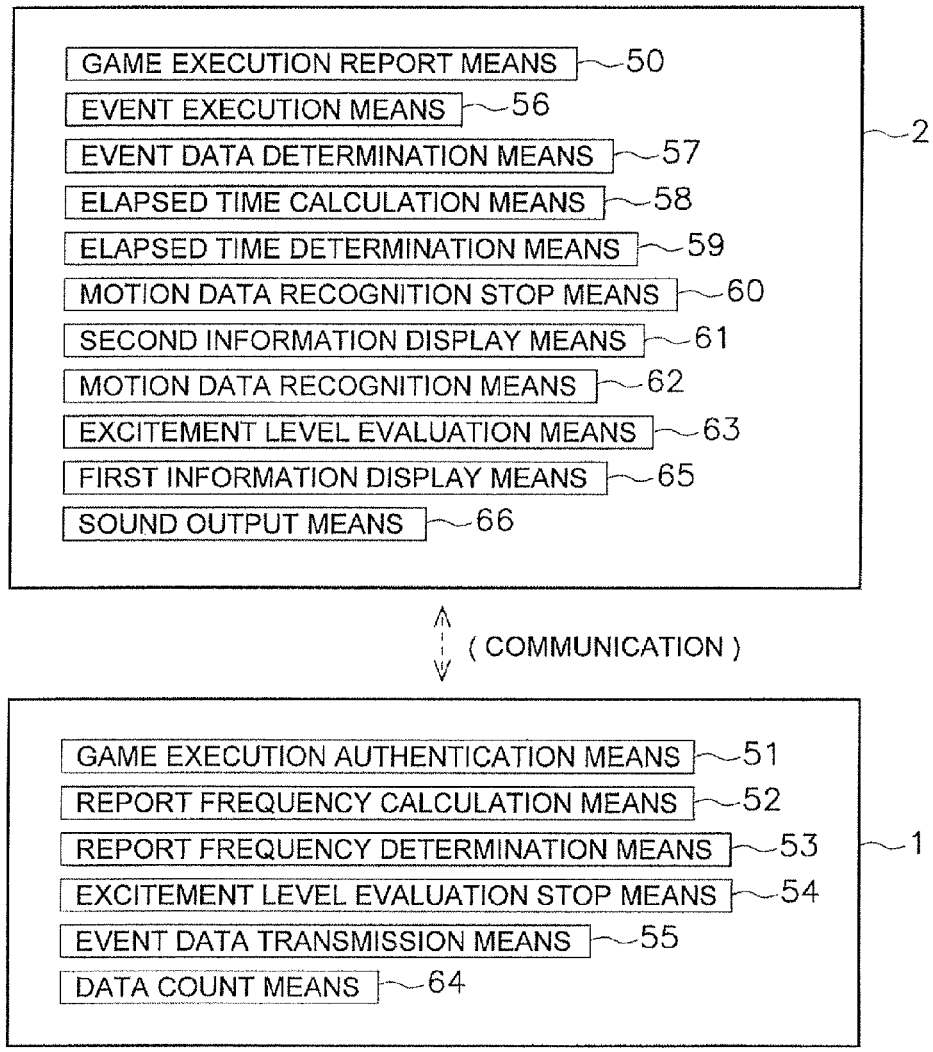
FIG. 3 is a diagram showing functions to be realized by a server and the mobile phone (i.e., a client)

An example of the video game to be executed in the present game system is a baseball video game. Each mobile phone 2, which is embedded with the motion sensor 209, is allowed to execute a network video game as the present video game when being connected to the server 1. FIG. 3 is a functional block diagram for explaining functions taking major roles in the present invention. As shown in FIG. 3, at least either the mobile phone 2 or the server 1 realizes the following functions (means). The baseball video game is herein referred to as, for instance, a game of a type configured to be automatically proceeded while reproducing a real world's baseball match already performed (or being currently performed) in a game space, not a game of a match-up type configured to allow a game player to move a game character by manipulating a variety of keys provided in a mobile phone or a variety of keys provided in a game pad of a game device. In other words, it is herein premised that a game player is not allowed to directly get involved in a match-up. The game, herein configured to automatically proceed, may be a game of a type configured to cause a computer to virtually perform a match-up, as well as a game of a type configured to reproduce a baseball match of the real world.

A game execution report means 50 has a function of causing the CPU 201 of the mobile phone 2 to execute a processing of reporting execution of the baseball video game to the server 1. In the means, the CPU 201 of the mobile phone 2 executes the processing of reporting execution of the baseball video game to the server 1. In the game execution report means 50, for instance, the CPU 201 of the mobile phone 2a issues a connection request to be transmitted to the server 1 for allowing a game player operating the mobile phone 2a to execute the baseball video game. Further, the other mobile phones 2b, 2c, etc executes processing similar to the above.

A game execution authentication means 51 has a function of causing the CPU 101 of the server 1 to execute a processing of authenticating execution of the baseball video game in the mobile phone 2. In the game execution authentication means 51, the CPU 101 of the server 1 executes the processing of authenticating execution of the baseball video game in the mobile phone 2. In the game execution authentication means 51, for instance, the CPU 101 of the server 1 determines whether or not the connection request transmitted to the server 1 is valid. When the CPU 101 of the server 1 determines that the connection request is valid, the CPU 101 of the server 1 executes a processing of authenticating execution of the baseball video game in the mobile phone 2.

A report frequency calculation means 52 has a function of causing the CPU of the server 1 to execute a processing of calculating report frequency data corresponding to frequency that execution of the baseball video game is reported to the server 1. In the report frequency calculation means 52, the CPU of the server 1 executes the processing of calculating the report frequency data corresponding to frequency that execution of the baseball video game is reported to the server 1. In the report frequency calculation means 52, for instance, when the CPU 101 of the server 1 authenticates execution of the baseball video game in the mobile phone 2, the CPU 101 of the server 1 executes a processing of incrementing the report frequency data. Further, when the CPU 101 of the server 1 authenticates executions of the baseball video game in a plurality of the mobile phones 2, the CPU 101 of the server 1 executes the processing of incrementing the report frequency data a plurality of times.

A report frequency determination means 53 has a function of causing the CPU 101 of the server 1 to determine whether or not a number corresponding to the report frequency data reaches a predetermined number. In the report frequency determination means 53, the CPU 101 of the server 1 determines whether or not a number corresponding to the report frequency data reaches a predetermined number. In the report frequency determination means 53, for instance, the CPU 101 of the server 1 determines whether or not a number corresponding to the report frequency data reaches "10,000 (people)".

An excitement level evaluation stop means 54 has a function of causing the CPU 101 of the server 1 to issue a command of stopping a processing of totalizing and obtaining statistic of excitement level data when the number corresponding to the report frequency data reaches the predetermined number. In the excitement level evaluation stop means 54, the CPU 101 of the server 1 issues the command of stopping the processing of totalizing and obtaining the statistic of the excitement level data when the number corresponding to the report frequency data reaches the predetermined number.

In the excitement level evaluation stop means 54, for instance, when the number corresponding to the report frequency data reaches "10,000 (people)", the CPU 101 of the server 1 issues a command of stopping the processing of totalizing and obtaining the statistic of the excitement level data. Specifically, when the number of people executing the baseball video game reaches 10,000, the CPU 101 of the server 1 issues the command of stopping the processing of totalizing and obtaining the statistic of the excitement level data. Accordingly, the CPU 101 of the server 1 stops the processing of totalizing and obtaining the statistic of the excitement level data.

An event data transmission means 55 has a function of causing the CPU 101 of the server 1 to execute a processing of transmitting event data for executing a match-up event of the baseball video game to the mobile phone 2 when execution of the baseball video game was reported to the server 1. In the event data transmission means 55, when execution of the baseball game was reported to the server 1, the CPU 101 of the server 1 executes the processing of transmitting the event data for executing a match-up event of the baseball video game to the mobile phone 2.

In the event data transmission means 55, for instance, when execution of the baseball video game was reported to the server 1, the event data for executing a match-up event of the baseball video game (e.g., event data for expressing a situation of a baseball match of the real world) is transmitted from the server 1 to the mobile phone 2. The event data, expressing a situation of a baseball match of the real world, is transmitted to the server 1 from an information seeker collecting information expressing a situation of a baseball match of the real world. The event data received by the server 1 is then stored in the data storage unit 103 of the server 1.

An event execution means 56 has a function of causing the CPU 201 of the mobile phone 2 to execute a match-up game event of the baseball video game based on the event data. In the event execution means 56, the CPU 201 of the mobile phone 2 executes a match-up game event of the baseball video game based on the event data.

In the event execution means 56, for instance, the CPU 201 of the mobile phone 2 executes a match-up event of the video game, which reproduces a situation of a baseball match of the real world, using the event data. When the game program is thus run, the display 203 of the mobile phone 2 displays a baseball video game reproducing a situation of a baseball match of the real world.

An event data determination means 57 has a function of causing the CPU 201 of the mobile phone 2 to determine whether or not predetermined event data was received during execution of the match-up event. In the event data determination means 57, the CPU 201 of the mobile phone 2 determines whether or not the predetermined event data was received during execution of the match-up event. In this case, for instance, when occurrence of the event of a predetermined type (e.g., an event that a batter character hits a homer) is reported during execution of the match-up event, the CPU 201 of the mobile phone 2 starts executing a processing of recognizing the motion data of a motion detected by the motion sensor 209.

In the event data determination means 57, for instance, the CPU 201 of the mobile phone 2 determines whether or not the mobile phone 2 received event data transmitted from the server 1, which expresses occurrence of a predetermined event (e.g., an event that a homer is hit), during execution of the match-up event. Specifically, the CPU 201 of the mobile phone 2 determines whether or not occurrence of a predetermined event (e.g., occurrence of an event that a batter hit a homerun) was reported to the mobile phone 2 during execution of the match-up event.

An elapsed time calculation means 58 has a function of causing the CPU 201 of the mobile phone 2 to execute a processing of measuring an elapsed time since the CPU 201 of the mobile phone 2 recognized the predetermined event data when the CPU 201 of the mobile phone 2 determined that the CPU 201 of the mobile phone 2 had received the predetermined event data during execution of the match-up event. In the elapsed time calculation means 58, the CPU 201 of the mobile phone 2 executes the processing of measuring an elapsed time since the CPU 201 of the mobile phone 2 recognized the predetermined event data when the CPU 201 of the mobile phone 2 determined that the CPU 201 of the mobile phone 2 had received the predetermined event data during execution of the match-up event. In the elapsed time calculation means 58, for instance, the CPU 201 of the mobile phone 2 measures an elapsed time since the CPU 201 of the mobile phone 2 recognized the predetermined event data when the mobile phone 2 received the predetermined event data during execution of the match-up event.

An elapsed time determination means 59 has a function of causing the CPU of the mobile phone 2 to determine whether or not the elapsed time is equal to a predetermined period of time. In the elapsed time determination means 59, the CPU of the mobile phone 2 determines whether or not the elapsed time is equal to the predetermined period of time. In the elapsed time determination means 59, for instance, the CPU of the mobile phone 2 determines whether or not the elapsed time is equal to a predetermined period of time (e.g., "10 (seconds)").

A motion data recognition stop means 60 has a function of causing the CPU of the mobile phone 2 to execute a processing of stopping recognition of motion data detected by the motion sensor 209 when the elapsed time is equal to or longer than the predetermined period of time. In the motion data recognition stop means 60, the CPU of the mobile phone 2 executes the processing of stopping recognition of the motion data detected by the motion sensor 209 when the elapsed time is equal to the predetermined period of time.

In the motion data recognition stop means 60, for instance, the CPU of the mobile phone 2 issues a command of stopping receipt of the motion data detected by the motion sensor 209 when the elapsed time is equal to the predetermined period of time (e.g., 10 (seconds)). Accordingly, the CPU 201 of the mobile phone 2 stops a processing of recognizing the motion data.

In the case herein exemplified, the CPU 201 of the mobile phone 2 stops the processing of recognizing the motion data. However, the motion sensor 209 may be configured to stop detection of movement of the mobile phone 2 for causing the CPU 201 of the mobile phone 2 to stop the processing of recognizing the motion data as a result.

A second information display means 61 has a function of causing the display 203 of the mobile phone 2 to display information of reporting start of recognition of the motion data detected by the motion sensor 209 when the CPU 201 of the mobile phone 2 determines that the CPU 201 of the mobile phone 2 received the predetermined event data during execution of the match-up event. In the second information display means 61, the display 203 of the mobile phone 2 displays the information of reporting start of recognition of the motion data detected by the motion sensor 209 when the CPU 201 of the mobile phone 2 determines that the CPU 201 of the mobile phone 2 received the predetermined event data during execution of the match-up event.

In the second information display means 61, for instance, the CPU 201 of the mobile phone 2 issues a command of causing the display 203 of the mobile phone 2 to display information of reporting start of recognition of the motion data when the mobile phone 2 received predetermined event data (e.g., event data expressing occurrence of an event that a homer is hit) during execution of the match-up event. Accordingly, the display 203 of the mobile phone 2 displays the information.

Specifically, the display 203 of the mobile phone 2 displays character information such as "CHEER THEM UP!" and "SHAKE YOUR MOBILE PHONE!" when occurrence of a predetermined event (e.g., occurrence of an event that a homer is hit) was reported to the mobile phone 2 during execution of the match-up event. The character information herein corresponds to information of reporting start of recognition of the motion data.

A motion data recognition means 62 has a function of causing the CPU 201 of the mobile phone 2 to recognize the motion data detected by the motion sensor 209 during execution of the match-up event.

In the motion data recognition means 62, the CPU 201 of the mobile phone 2 recognizes the motion data detected by the motion sensor 209 during execution of the match-up event.

In the motion data recognition means 62, in detail, the CPU 201 of the mobile phone 2 recognizes the motion data detected by the motion sensor 209 when the CPU 201 of the mobile phone 2 determines that the CPU 201 of the mobile phone 2 received the predetermined event data during execution of the match-up event.

In the motion data recognition means 62, in more detail, the CPU 201 of the mobile phone 2 recognizes the motion data detected by the motion sensor 209 after the display 203 of the mobile phone 2 displays the information of reporting start of recognition of the motion data detected by the motion sensor 209.

Further in the motion data recognition means 62, the CPU 201 of the mobile phone 2 recognizes the motion data detected by the motion sensor 209 when the elapsed period of time is less than the predetermined period of time.

In the motion data recognition means 62, for instance, the CPU 201 of the mobile phone 2 starts recognizing the motion data detected by the motions sensor 209 when the CPU 201 of the mobile phone 2 issues a command of causing the display 203 of the mobile phone 2 to display the information of reporting start of recognition of the motion data during execution of the match-up event. While the elapsed period of time is less than the predetermined period of time (e.g., 10 (seconds)), the CPU 201 of the mobile phone 2 recognizes the motion data detected by the motion sensor 209.

An excitement level evaluation means 63 has a function of causing at least one of the CPU 201 of the mobile phone 2 and the CPU 101 of the server 1 to evaluate excitement level data corresponding to respective actions of a plurality of game players having responded to the match-up event based on the motion data.

In the excitement level evaluation means 63, at least one of the CPU 201 of the mobile phone 2 and the CPU 101 of the server 1 evaluates the excitement level data corresponding to the respective actions of a plurality of game players having responded to the match-up event based on the motion data.

In the excitement level evaluation means 63, in detail, the CPU 201 of the mobile phone 2 calculates frequency of movement of the mobile phone 2 based on the motion data. Then, at least one of the CPU 201 of the mobile phone 2 and the CPU 101 of the server 1 evaluates the excitement level data depending on the frequency.

In the excitement level evaluation means 63, for instance, the CPU 201 of the mobile phone 2 is caused to execute a processing of integrating the motion data (acceleration data) for computing the shaking speed of the mobile phone 2. Then, the CPU 201 of the mobile phone 2 determines whether or not the sign of the shaking speed is reversed every single frame (1/60 seconds). In detail, the CPU 201 of the mobile phone 2 executes a processing of multiplying the shaking speed at a predetermined point-of-time and the shaking speed at the next point-of-time. The CPU 201 of the mobile phone 2 then determines whether or not the computed product is negative. When the sign of the shaking speed is reversed (e.g., when the product of the shaking speed at a predetermined point-of-time and the shaking speed of the next point-of-time is negative), the CPU 201 of the mobile phone 2 executes a processing of incrementing the frequency data expressing frequency of shaking of the mobile phone 2.

The CPU 201 of the mobile phone 2 evaluates the excitement level data depending on the frequency. For example, the CPU 201 of the mobile phone 2 counts frequency of shaking of the mobile phone 2 for a predetermined period of time (e.g., 10 seconds). The CPU 201 of the mobile phone 2 then evaluates the excitement level data depending on frequency of shaking of the mobile phone 2 after 10 seconds.

A data count means 64 has a function of causing the CPU 101 of the server 1 to execute a processing of totalizing and obtaining the statistic of the excitement level data and obtaining statistic. In the data count means 64, the CPU 101 of the server 1 executes the processing of totalizing and obtaining the statistic of the excitement level data.

In the data count means 64, for instance, the CPU 101 of the server 1 totalizes and obtains the statistic of the excitement level data transmitted to the server 1 respectively from a plurality of the mobile phones 2. Specifically, when a plurality of the mobile phones 2 respectively transmits the excitement level data to the server 1, all the excitement level data of the mobile phones 2 are stored in the RAM 102 of the server 1. Then, the CPU 101 of the server 1 computes values expressing degrees of the respective excitement levels based on all the excitement level data of the mobile phones 2.

A first information display means 65 has a function of causing the display 203 of the mobile phone 2 to display information of a result of evaluating respective actions of a plurality of game players having responded to the match-up event based on a result of totalizing and obtaining the statistic of the excitement level data. In the first information display means 65, the display 203 of the mobile phone 2 displays the information of a result of evaluating the respective actions of a plurality of game players having responded to the match-up event based on a result of totalizing and obtaining the statistic of the excitement level data. In the first information display means 65, for instance, when the excitement level data is totalized and obtaining the statistic of by the server 1, the result of totalizing and obtaining the statistic of the excitement level data is transmitted respectively to a plurality of the mobile phones 2 from the server 1. Accordingly, the display 203 of each mobile phone 2 displays the information of a result of evaluating the respective actions of a plurality of game players having responded to the match-up event.

The information of a result of evaluating the respective actions of a plurality of game players having responded to the match-up event includes, for instance, the following information: the number of game players having responded to the match-up event; magnitudes of the excitement levels; indexes expressing the magnitudes of the excitement levels; and plays having higher excitement levels.

A sound output means 66 has a function of causing the mobile phone 2 to output a sound corresponding to a result of evaluating the respective actions of a plurality of game players having responded to the match-up event based on the excitement level data. In the sound output means 66, the speaker 204 of the mobile phone 2 outputs the sound corresponding to a result of evaluating the respective actions of a plurality of game players having responded to the match-up event based on the excitement level data. In the sound output means 66, for instance, when the excitement level data are totalized by the server 1, the result of the excitement level data is transmitted respectively to a plurality of mobile phones 2 from the server 1. Accordingly, the speaker 204 of each mobile phone 2 outputs the sound corresponding to a result of evaluating the respective actions of a plurality of game players having responded to the match-up event. It is herein possible to evaluate attitudinal expressions and feelings of a plurality of game players having responded to the match-up event and output a sound based on the evaluation from the speaker unit 204 of the mobile phone 2 of each game player. Accordingly, a plurality of game players can feel a variety of feelings such as a feeling of participating in a game together with the other game players and a feeling of watching a game together with the other game players. In other words, according to the game system, it is possible to provide each of a plurality of game players with a highly interesting player participatory type game without making each of the game players feel boring.

Summary of Excitement Level Evaluation System in Network Baseball Video Game

Figure 9:
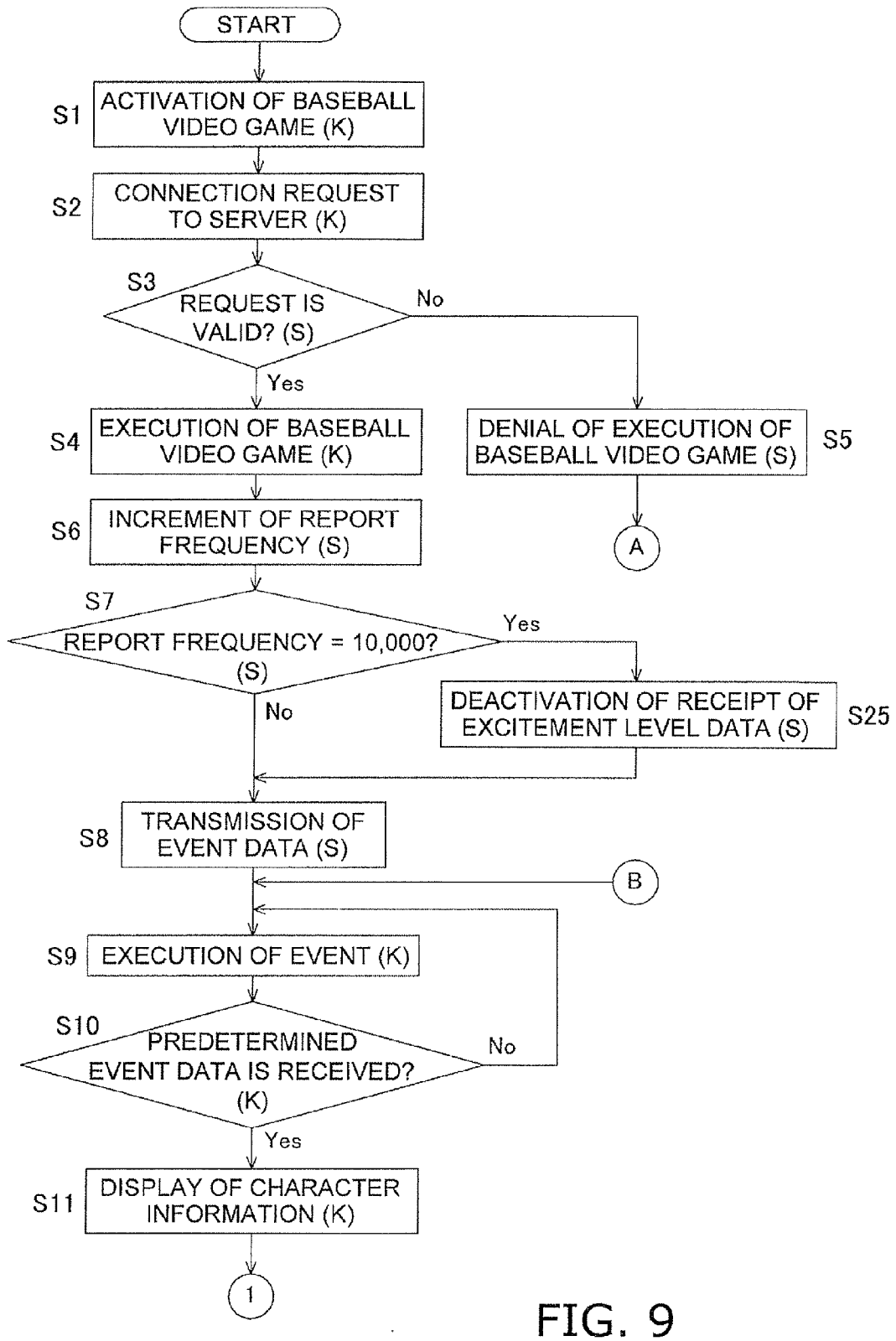
FIG. 9 is a flowchart showing a part of an excitement level evaluation system in the video game.
Figure 10:
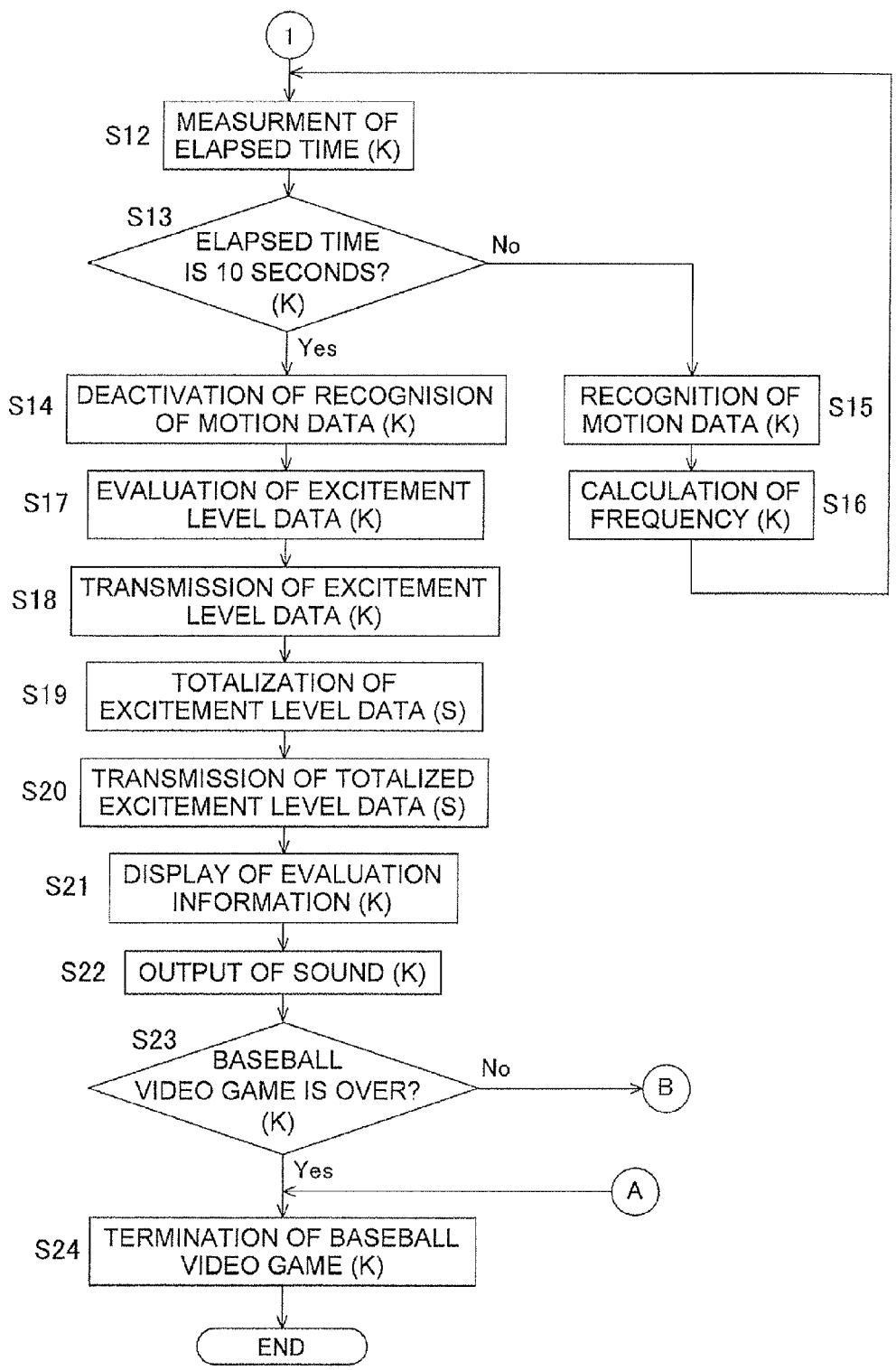
FIG. 10 is a flowchart showing the rest of the excitement level evaluation system in the video game.

Next, the specific content of the excitement level evaluation system in the baseball video game will be hereinafter explained. Simultaneously, a series of flow shown in FIGS. 9 and 10 will be hereinafter explained. In the flowchart shown in FIGS. 9 and 10, the processing to be executed by the server 1 and the processing to be executed by the mobile phone 2 are discriminated from each other by assigning reference numerals "S" to steps of the processing to be executed by the server 1 and assigning reference numerals (K) to steps of the processing to be executed by the mobile phone 2.

In the excitement level evaluation system, a situation of a baseball match of the real world is reproduced in the baseball video game.

First, the CPU 201 of the mobile phone 2 (i.e., mobile phones 2a, 2b, 2c, etc) activates a game program for reproducing a situation of a baseball match of the real world. When a game player presses a key for activating a baseball video game, for instance, the CPU 201 of the mobile phone 2 activate the game program for the baseball video game (Step S1).

The RAM 202 of the mobile phone 2 herein stores the game program for the baseball video game. The game program for the baseball video game, stored in the RAM 202 of the mobile phone 2, is herein assumed to have been preliminarily downloaded to the mobile phone 2 from the server 1. In the present example, the game program has been thus preliminarily supplied to the mobile phone 2 from the server 1. However, any suitable method can be applied for storing the game program in the mobile phone 2. For example, the game program may be configured to be stored in the mobile phone 2 through a recording medium. Alternatively, the game program may be designed to be stored in the mobile phone 2 at the time of shipping of the mobile phone 2.

When executing the game program for the baseball video game, the CPU 201 of the mobile phone 2 issues a connection request to be transmitted to the server 1 (Step S2). The CPU 101 of the server 1 then determines whether or not the connection request to the server 1 is valid (Step S3). When determining that the connection request is valid (Yes in Step S3), the CPU 101 of the server 1 executes a command for allowing execution of the baseball video game in the mobile phone 2 (Step S4). When determining that the connection request is not valid, on the other hand, the CPU 101 of the server 1 issues a command of denying execution of the baseball video game in the mobile phone 2 (Step S5).

When a game player herein connects the mobile phone 2 to the server 1 and executes a predetermined procedure with respect to the server 1 through the mobile phone 2, the mobile phone 2 is registered with the server 1. When the mobile phone 2 is thus once registered with the server 1 and then issues a connection request to the server 1, the server 1 authenticates that the connection request from the mobile phone 2 is valid.

The aforementioned processing of authenticating a connection request is executed, for instance, based on identification numbers ID uniquely assigned to the respective mobile phones 2. Specifically, when the mobile phone 2 is registered with the server 1, the RAM 102 of the server 1 stores the identification number ID of the mobile phone 2. When the mobile phone 2 subsequently issues a connection request to the server 1, the server 1 verifies whether or not the identification number ID, transmitted to the server 1 from the mobile phone 2, is matched with any of the identification numbers ID stored in the RAM 102 of the server 1. When the identification number ID, transmitted to the server 1 from the mobile phone 2, is matched with any one of the identification numbers ID stored in the server 1, the server 1 authenticates that the connection request from the mobile phone 2 is valid.

When the CPU 101 of the server 1 issues a command of allowing execution of the baseball video game and the mobile phone 2 executes the baseball video game, the CPU 101 of the server 1 executes a processing of incrementing report frequency data HD corresponding to frequency that execution of the baseball video game is reported to the server 1 (Step S6). The report frequency data HD herein corresponds to frequency that execution of the baseball video game is allowed. The CPU 101 of the server 1 then determines whether or not the number expressed by the report frequency data HD reaches a predetermined number. For example, the CPU 101 of the server 1 determines whether or not the number of people executing the baseball video game reaches "10,000 (people)" (Step S7).

When determining that the number expressed by the report frequency data HD, i.e., the number of people executing the present baseball video game reaches "10,000 (people)" (HD=10,000, Yes in Step S7), the CPU 101 of the server 1 issues a command of stopping receipt of excitement level data KD (ID) of the mobile phones 2 of "10,001$^{st}$" and subsequent game players (Step S25). Accordingly, event data ED is configured to be transmitted to the mobile phones 2 of the "10,001$^{st}$" and subsequent game players, while the excitement level data KD (ID) of the "10,001$^{st}$" and subsequent game players are configured to be excluded from processing targets.

On the other hand, when the server 1 allows execution of the baseball video game in the mobile phone 2 but the number expressed by the report frequency data HD, i.e., the number of people executing the present baseball video game does not reach "10,000 (people)" (HD<10,000, No in Step S7), the server 1 transmits the event data ED for executing a match-up event of the baseball video game (e.g., the event data ED for expressing a situation of a baseball match of the real world) to the mobile phone 2 (Step S8). Based on the event data ED, the CPU 201 of the mobile phone 2 accordingly executes the match-up event of the baseball video game for reproducing the situation of the baseball match of the real world.

Specifically, the event data ED includes data of baseball players playing in a baseball match of the real world (e.g., fielder data and batter data), data expressing a situation of the baseball match, and the like. For example, the data of the baseball players herein includes data expressing positions of the respective fielders, data expressing batting averages of the respective batters, and the like. Meanwhile, the data expressing a situation of the baseball match includes data expressing a situation of scores (score data of two teams), data expressing a situation of runners on bases, data expressing a situation of count, data expressing a situation of a play, and the like.

The relations between the respective events and the event data ED are defined based on a correspondence table shown in FIG. 4. FIG. 4 omits the data of the baseball players and shows only elements of the data expressing a situation of a baseball match. The data expressing a situation of a baseball match is formed by the combination of the data elements.

As to the situation of scores, for instance, the score of a team A corresponds to a value in the tenth digit, whereas the score of a team B corresponds to a value in the unit digit. The situation of runners on bases is set as follows. When a runner is at the first base, a value in the hundredth digit is set to be 1. When no runner is at the first base, on the other hand, a value of the hundredth digit is set to be 0. Similarly, when no runner is at the second base, a value in the tenth digit is set to be 1.

When the second base is not occupied by a runner, on the other hand, a value in the tenth digit is set to be 0. Similarly, when the third base is occupied by a runner, a value in the unit digit is set to be 1. When no runner is at the third base, on the other hand, a value in the unit digit is set to be 0. Further, the situation of count is set as follows. The number of strikes is set to be a value in the tenth digit, whereas the number of balls is set to be a value in the unit digit. Yet further, as to the situation of a play, a single (hit), a double (hit), a triple (hit), and a homer are respectively set to be 1, 2, 3, and 4, for instance.

In an exemplary case of "the score of the team A is 1; the score of the team B is 2; no runner is at the first base: the count is 1-2 (one ball and two strikes); the situation of a play is a single (hit)", the event data ED is set to be 0102100211 (01, 02, 100, 21, 1).

Figure 5:
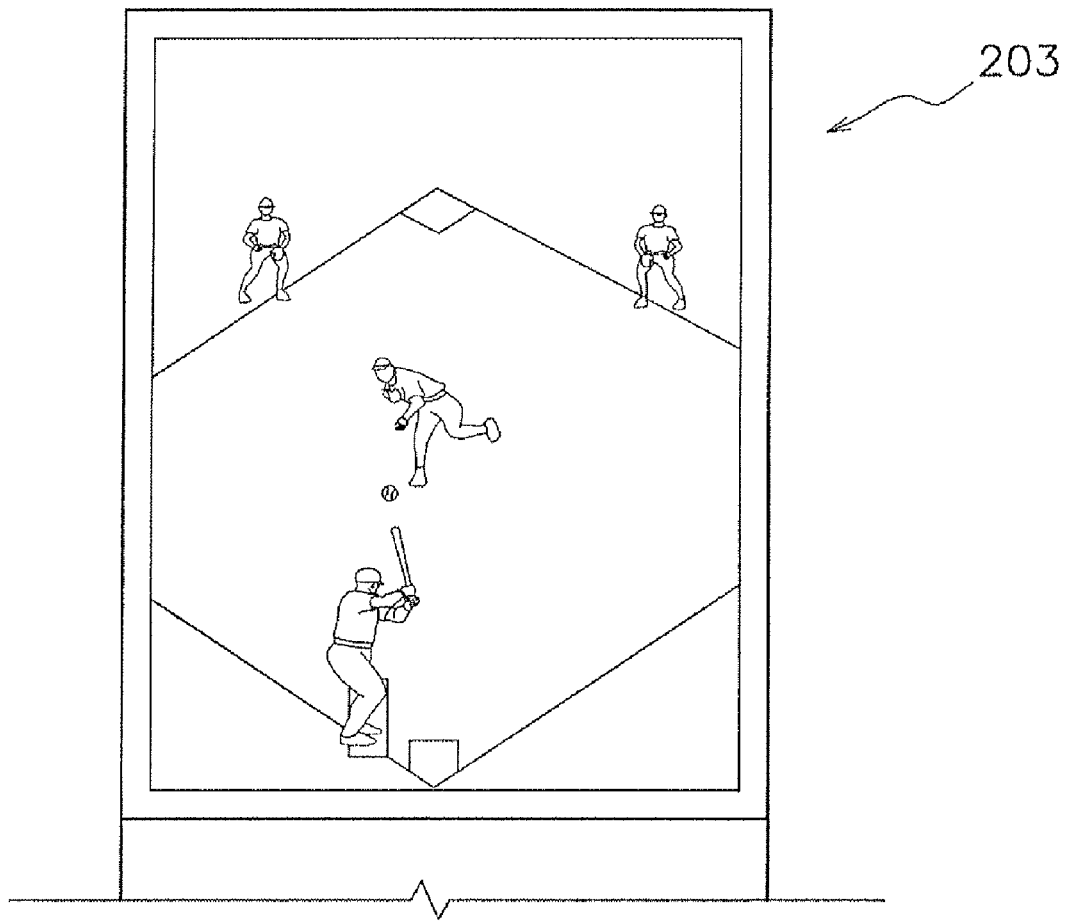
FIG. 5 is a diagram illustrating a screen to be displayed when the video game is executed.

An identical situation to a baseball match of the real world is reproduced in the baseball video game based on the aforementioned event data ED. When a pitcher releases the ball in a baseball match of the real world, for instance, the display 203 of the mobile phone 2 displays a situation reproduced in the baseball video game, i.e., a scene that a pitcher character drawn in an exaggerated shape releases the ball as illustrated in FIG. 5. When a batter hits the ball and is at the first base in a baseball match of the real world, the display 203 of the mobile phone 2 displays a situation reproduced in the baseball video game, i.e., a scene that a batter character drawn in an exaggerated shape hits the ball and is at the first base.

The event data ED, expressing a situation of a baseball match of the real world, is transmitted to the server 1 from an information seeker seeking information expressing a situation of a baseball match of the real world. The event data ED received by the server 1 is stored in the data storage unit 103 of the server 1. The event data ED is subsequently transmitted to the mobile phone 2 from the server 1.

A situation of a baseball math of the real world is thus reproduced in the baseball video game (Step S9). Under the condition, the CPU 201 of the mobile phone 2 determines whether or not the mobile phone 2 received the event data ED expressing occurrence of a predetermined event (Step S10). Specifically, the CPU 201 of the mobile phone 2 determines whether or not occurrence of the predetermined event was reported to the mobile phone 2 during execution of the match-up event. The determination is configured to be executed after execution of the predetermined event.

For example, event data EDS1 (i.e., EDS1_1, EDS1_2, EDS1_3, and EDS1_4) is herein prepared as predetermined event data EDS for expressing a situation that a batter hits the ball (i.e., a single hit, a double hit, a third hit, and a homer). The event that a batter hits the ball is herein set as the predetermined event. However, any other events may be alternatively set as the predetermined event.

Figure 6:
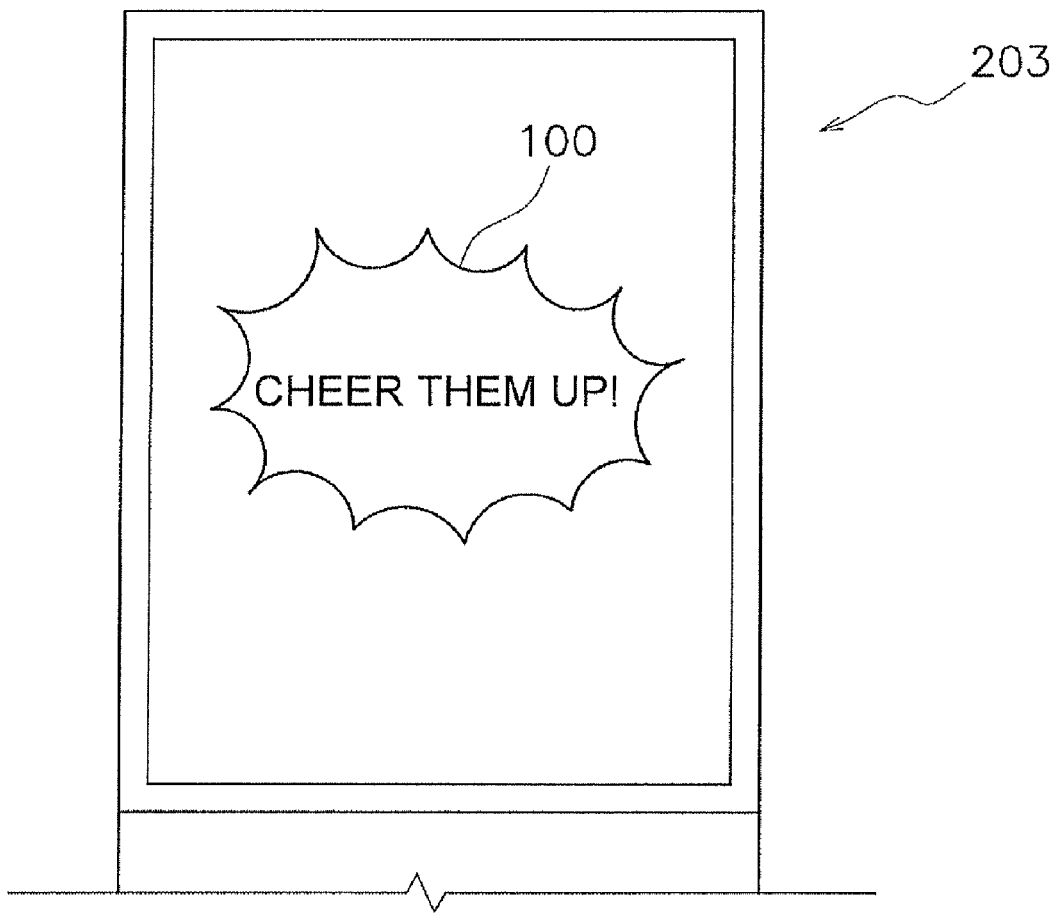
FIG. 6 is a diagram illustrating character information to be displayed when a predetermined event is executed.

When the mobile phone 2 receives the predetermined event data EDS during execution of the match-up event (Yes in Step S10), the CPU 201 of the mobile phone 2 issues a command of causing the display 203 of the mobile phone 2 to display information 100 for reporting start of recognition of motion data MD. As illustrated in FIG. 6, for instance, the display 203 of the mobile phone 2 displays character information 100 such as "CHEER THEM UP!" or "SHAKE YOUR MOBILE PHONE!" (Step S11). The character information 100 herein corresponds to information for reporting start of recognition of the motion data MD. When the mobile phone 2 has not received the predetermined event data EDS during execution of the match-up event (No in Step S10), the CPU 201 of the mobile phone 2 repeatedly executes the processing step shown in Step S9.

When the mobile phone 2 received the predetermined event data EDS during execution of the match-up event, the CPU 201 of the mobile phone 2 executes a processing of measuring an elapsed time Tk from a point-of-time T0, i.e., an elapsed time since the CPU 201 of the mobile phone 2 recognized the predetermined event data EDS (Step S12). The CPU 201 of the mobile phone 2 then determines whether or not the elapsed time Tk is equal to a predetermined period of time (e.g., 10 (seconds)) every single frame (1/60 seconds) (Step S13). The CPU 201 of the mobile phone 2 issues a command of stopping receipt of the motion data MD when the elapsed time TK reaches "10 (seconds)" (Tk=10, Yes in Step S13). Accordingly, the CPU 201 of the mobile phone 2 stops the processing of recognizing the motion data MD (Step S14). When the elapsed time Tk is less than "10 (seconds)" (Tk<10, No in Step S13), on the other hand, the CPU 201 of the mobile phone 2 recognizes the motion data MD detected by the motion sensor 209 (Step S15). In other words, the CPU 201 of the mobile phone 2 recognizes the motion data MD detected by the motions sensor 209 until "10 (seconds)" elapses after the mobile phone 2 received the predetermined event data EDS during execution of the match-up event.

While recognizing the motion data MD, the CPU 201 of the mobile phone 2 evaluates the excitement level data KD (ID) corresponding to the respective actions of a plurality of game players having responded to the match-up event based on the motion data MD.

For example, the CPU 201 of the mobile phone 2 calculates frequency data N (ID) expressing frequency of movement of the mobile phone 2 based on the motion data MD (Step S16). At least one of the CPU 201 of the mobile phone 2 and the CPU 101 of the server 1 evaluates the excitement level data KD (ID) based on a value of the frequency data N (ID).

Specifically, the CPU 201 of the mobile phone 2 firstly executes a processing of integrating the motion data MD (acceleration data). Accordingly, the shaking speed of the mobile phone 2 is calculated and the CPU 201 of the mobile phone 2 recognizes the shaking speed.

The CPU 201 of the mobile phone 2 then determines whether or not the sign of the shaking speed is reversed every single frame (1/60 seconds). For example, the CPU 201 of the mobile phone 2 executes a processing of multiplying the shaking speed at a predetermined point-of-time and the shaking speed at the next point-of-time. The CPU 201 of the mobile phone 2 then determines whether or not the product of the shaking speeds is negative.

When the product of the shaking speed at a predetermined point-of-time and the shaking speed at the next point-of-time is negative, the CPU 201 of the mobile phone 2 executes a processing of incrementing the frequency data N (ID) expressing frequency of shaking of the mobile phone 2. When the product of the shaking speed at a predetermined point-of-time and the shaking speed at the next point-of-time is positive, on the other hand, the CPU 201 of the mobile phone 2 does not execute the processing of incrementing the frequency data N (ID) expressing frequency of shaking of the mobile phone 2, and executes the processing of recognizing the motion data MD again.

The CPU 201 of the mobile phone 2 repeatedly executes the processing until the elapsed time Tk reaches "10 (seconds)". When the elapsed time Tk reaches "10 (seconds)" (Yes in Step S13), the processing of recognizing the motion data MD is stopped (Step S14). The CPU 201 of the mobile phone 2 then evaluates the excitement level data KD (ID) based on the frequency data N (ID) expressing frequency of shaking of the mobile phone 2 (Step S17).

The CPU 201 of the mobile phone 2 counts the frequency data N (ID) expressing frequency of shaking of the mobile phone 2 for 10 seconds. The CPU 201 of the mobile phone 2 then evaluates the excitement level data KD (ID) based on the value of the frequency data N (ID) after 10 seconds.

The excitement level data KD (ID) is herein evaluated as follows. For example, the value of the frequency data N (ID) expressing frequency of shaking of the mobile phone 2 after 10 seconds is used as data for evaluating magnitude of excitement. Specifically, the excitement level can be interpreted to be high in proportion to frequency of shaking of the mobile phone 2 after 10 seconds (i.e., in proportion to the value of the frequency data N (ID)). On the other hand, the excitement level can be interpreted to be low in reverse proportion to frequency of shaking of the mobile phone 2 after 10 seconds (i.e., in reverse proportion to the value of the frequency data N (ID)).

Based on the above interpretation, the CPU 201 of the mobile phone 2 sets the excitement level data KD (ID) corresponding to the frequency data N (ID) of shaking of the mobile phone 2 after 10 seconds. As illustrated in FIG. 7, for instance, when the frequency (i.e., the value of the frequency data N (ID)) is more than or equal to 100, the CPU 201 of the mobile phone 2 recognizes the excitement level data KD (ID) (="1") expressing a "highest" excitement level. When the frequency is more than or equal to 80 and less than 100, the CPU 201 of the mobile phone 2 recognizes the excitement level data KD (ID) (="2") expressing a "high" excitement level. When the frequency is more than or equal to 50 and less than 80, the CPU 201 of the mobile phone 2 recognizes the excitement level data KD (ID) (="3") expressing a "normal" excitement level. When the frequency is more than or equal to 20 and less than 50, the CPU 201 of the mobile phone 2 recognizes the excitement level data KD (ID) (="4") expressing a "low" excitement level. When the frequency is more than or equal to 0 and less than 20, the CPU 201 of the mobile phone 2 recognizes the excitement level data KD (ID) (="5") expressing a "lowest" excitement level.

In the case herein described, the mobile phone 2 is configured to evaluate the excitement level data KD (ID). However, the frequency data N (ID) of shaking of the mobile phone 2 after 10 seconds may be configured to be transmitted to the server 1, and the server 1 may be configured to evaluate the excitement level data KD (ID) corresponding to the frequency data N (ID).

When the excitement level data KD (ID) is evaluated and set, a plurality of the mobile phones 2 respectively transmits the excitement level data KD (ID) to the server 1 (Step S18). The CPU 101 of the server 1 then totalizes and obtains the statistic of the excitement level data KD (ID) transmitted to the server 1 from the respective mobile phones 2 (Step S19). For example, when the respective mobile phones 2 transmits the excitement level data KD (ID) to the server 1, the RAM 102 of the server 1 stores the excitement level data KD (ID) of all the mobile phones 2. The CPU 101 of the server 1 calculates values expressing magnitudes of the respective excitement levels based on the excitement level data KD (ID) of all the mobile phones 2. In other words, based on the excitement level data KD (ID) of all the mobile phones 2, the CPU 101 of the server 1 calculates the number of people categorized into the "highest" excitement level, the number of people categorized into the "high" excitement level, the number of people categorized into the "normal" excitement level, the number of people categorized into the "low" excitement level, and the number of people categorized into the "lowest" excitement level.

Specifically, when the server 1 receives the excitement level data KD (ID) from one of a plurality of the mobile phones 2 and the value of the excitement level data KD (ID) is "1", the CPU 101 of the server 1 executes a processing of incrementing a value of first data KDT (1) expressing the number of people categorized into the "highest" excitement level. Similarly, when the value of the excitement level data KD (ID) is any one of "2", "3", "4", and "5", the CPU 101 of the server 1 executes a processing of incrementing a value of a corresponding one of second data KDT (2), third data KDT (3), fourth data KDT (4) and fifth data KDT (5). The CPU 101 of the server 1 calculates data KDT(n) expressing magnitudes of the respective excitement levels by repeatedly executing the aforementioned processing with respect to the excitement level data KD (ID) of all of the plurality of the mobile phones 2.

When thus totalizing and obtaining the statistic of the excitement level data KD (ID), the server 1 transmits the result of totalizing and obtaining the statistic of the excitement level data KDT(n) (n=1, 2, 3, 4, 5) to the respective mobile phones 2 (Step S20). Accordingly, the display 203 of each mobile phone 2 displays evaluation information 101 expressing a result of evaluating respective actions of a plurality of game players having responded to the match-up event (Step S21). For example, the evaluation information 101, expressing a result of evaluating respective actions of a plurality of game players having responded to the match-up event, includes a variety of information such as the number of game players having responded to the match-up event, magnitudes of the excitement levels, indicators expressing the magnitudes of the excitement levels, and plays evoking higher excitement levels.

Figure 8:
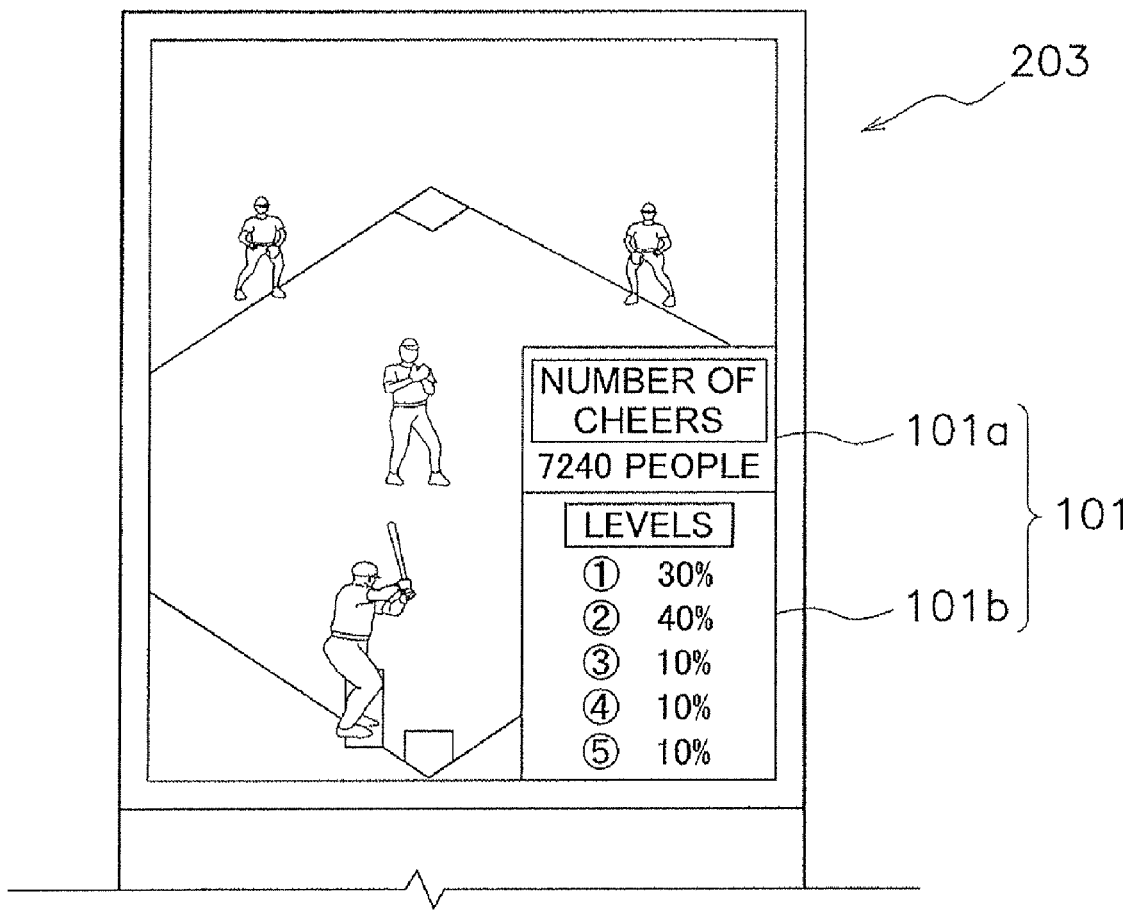
FIG. 8 is a diagram illustrating an evaluation result (evaluation information) or statistic of the excitement levels totalized by the server.

FIG. 8 shows the number (101a) of game players responded to a match-up event and an indicator (101b) expressing the magnitudes of the excitement levels. In this case, the CPU 201 of the mobile phone 2 is caused to execute a processing of calculating values expressing the magnitudes of all the excitement levels, i.e., a processing of totalizing and obtaining the statistic of the excitement level data KDT(n) (i.e., $\Sigma KDT(n)$), for obtaining the total number of game players having responded to the match-up event. Further, the CPU 201 of the mobile phone 2 is caused to execute a processing of dividing the values expressing the magnitudes of the respective excitement levels by the number (i.e., the total number) of game players having responded to the match-up event (i.e., $KDT(n)/\Sigma KDT(n)$) for obtaining indicators expressing the magnitudes of the respective excitement levels. In FIG. 8, the indicators expressing the magnitudes of the respective excitement levels are indicated by percentage.

When the server 1 totalized and obtained the statistic of the excitement level data KD (ID), and transmitted the result of totalizing and obtaining the statistic of the excitement level data KDT(n) to the respective mobile phones 2, the speaker 204 of each mobile phone 2 outputs a sound expressing a result of evaluating respective actions of a plurality of game players having responded to the match-up event (Step S22). For example, the CPU 201 of the mobile phone 2 detects the maximum excitement level data KDT(n) by comparing the excitement level data KDT(n) (n=1, 2, 3, 4, 5) corresponding to the respective excitement levels. The speaker 204 of the mobile phone 2 then outputs a sound corresponding to an excitement level expressed by the detected excitement level data KDT(n).

In this case, the RAM 202 of the mobile phone 2 stores five sets of sound data corresponding to five kinds of cheers by audience. Normal sound volumes, which are set for the five sets of sound data, are different from each other. Accordingly, the speaker 204 of the mobile phone 2 is allowed to output cheers in different sound volumes depending on the excitement levels expressed by the detected excitement level data KDT(n). For example, the speaker 204 of the mobile phone 2 is allowed to output a sound corresponding to cheers under a setting that sound volume is sequentially reduced in the order of the "highest" excitement level, the "high" excitement level, the "normal" excitement level, the "low" excitement level, and the "lowest" excitement level.

In the case herein described, the speaker 204 of the mobile phone 2 is configured to output cheers as a sound. Depending on events, however, the speaker 204 may be alternatively configured to output boos as a sound.

When the match-up event is being executed, the CPU 201 of the mobile phone 2 determines whether or not the baseball video game was over (Step S23). When issuing a command of expressing end of the baseball video game (YES in Step S23), the CPU 201 of the mobile phone 2 executes a processing of terminating the baseball video game program (Step S24). When the command, expressing end of the baseball video game, has not been issued (No in Step S23), on the other hand, the CPU 201 of the mobile phone 2 executes the processing step shown in Step S9 again.

According to the present embodiment, as described above, the display 203 of the mobile phone 2 can display the information expressing a result of evaluating respective actions of a plurality of game players having responded to the match-up event when the game players shake their mobile phones 2 for expressing cheers or dissatisfaction (i.e., boos) with respect to a play (i.e., a predetermined event) being executed in the match-up event. In other words, the display 203 of the mobile phone 2 can display the information expressing a result of evaluating respective emotions of a plurality of game players executing the baseball video game when the game players shake their mobile phones for expressing cheers or dissatisfaction (i.e., boos) with respect to a play being executed in the match-up event. Accordingly, the game players can share a variety of feelings, such as a feeling that each game player participates in the same baseball game with other game players and a feeling that each game player watches the same baseball game with other game players. In other words, a highly interesting player participatory type game can be provided for each of a plurality of game players without making him/her feel boring. Then, a display unit 203 of the mobile phone 2 of each game player displays information expressing a result of evaluating the respective actions of the game players having responded to the match-up event based on a result of totalizing and obtaining the statistic of the excitement level data. In this case, the display unit 203 of the mobile 2 phone of each game player displays a variety of information such as magnitudes of the excitement levels, indicators expressing the magnitudes of the excitement levels, and a play evoking a higher excitement level. The excitement level herein includes a negative feeling such as boos in addition to a positive feeling such as cheers.

Other Exemplary Embodiments (a) The aforementioned exemplary embodiment has exemplified a case that the mobile phone 2 with the motion sensor 209 is used as an exemplary apparatus that the game program is applicable. However, any suitable apparatuses may be herein used as long as they are respectively embedded with the motion sensor 209 while being configured to run the game program and execute data transmission and receipt.

(b) The present invention includes a program for executing a video game and a computer-readable recording medium storing the program. Excluding the cartridge, the following computer-readable media may be used as the computer-readable recording medium: the flexible disks, semiconductor memories, the CD-ROMs, the DVDs, the MOs, the ROM cassettes, and the like.

Industrial Applicability

The present invention is usable for a player participatory game. In the game, information of a result of evaluating actions of a plurality of game players with respect to a play during execution of an event is displayed on a game screen under a condition that the game is being executed based on data transmitted from a server.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A game system for a game, comprising:
   a server; and
   a data transceiver apparatus being configured to report execution of the game to the server, the data transceiver apparatus including a motion sensor and an image display unit to display the game,
   the server being configured to transmit event data for executing an event of the game to the data transceiver apparatus when the execution of the game is reported to the server,
   the data transceiver apparatus being configured to execute the event of the game based on the event data, and to generate motion data based on a motion of the data transceiver apparatus detected by the motion sensor during execution of the event, the motion data indicating how a user moves the data transceiver apparatus,
   at least one of the data transceiver apparatus and the server being configured to generate excitement level data based on the motion data, the excitement level data indicating excitement level of the user,
   the server being configured to generate statistic of the excitement level data,
   the data transceiver apparatus being configured to receive the statistic from the server and display the statistic.

2. The game system according to claim 1, wherein
   the data transceiver apparatus is configured to calculate frequency of movement of the data transceiver apparatus based on the motion data, and at least one of the data transceiver apparatus and the server is configured to generate the excitement level data based on the frequency.

3. The game system according to claim 1, wherein the data transceiver apparatus is configured to determine whether or not the event data of a predetermined type is received during the event, and the data transceiver apparatus is configured to generate the motion data if the data transceiver apparatus determines that the event data of the predetermined type is received during execution of the event.

4. The game system according to claim 1, wherein the data transceiver apparatus is configured to determine whether or not the event data of a predetermined type is received during the event, the image display unit is configured to display information for reporting start of generating the motion data, if the data transceiver apparatus determines that the event data of the predetermined type is received during the event, and the data transceiver apparatus is configured to generate the motion data, after the image display unit displays the information for reporting the start of generating the motion data.

5. The game system according to claim 1, wherein the data transceiver apparatus is configured to determine whether or not the event data of a predetermined type is received during the event, the data transceiver apparatus is configured to measure elapsed time since when the data transceiver apparatus generates the event data of the predetermined type, if the data transceiver apparatus determines that the event data of the predetermined type is received during the event, the data transceiver apparatus is configured to determine whether or not the elapsed time is equal to a predetermined period of time, the data transceiver apparatus is configured to stop detecting the motion, if the elapsed time is equal to or longer than the predetermined period of time, and the data transceiver apparatus is configured to detect the motion, if the elapsed time is less than the predetermined period of time.

6. The game system according to claim 1, wherein the data transceiver apparatus is configured to output a sound based on the statistic.

7. The game system according to claim 1, wherein the server is configured to calculate report frequency data indicating how often the data transceiver apparatus reports the execution of the game to the server, the server is configured to determine whether or not the number of times which the data transceiver apparatus reports to the server reaches a predetermined number, and the server is configured to stop generating the statistic, if the number of times which the data transceiver apparatus reports to the server reaches the predetermined number.

8. A non-transitory computer readable medium storing a game program of a game with a server and a game transceiver apparatus having a motion sensor and an image display unit to display the game, the game program comprising:

code for reporting execution of the game by the data transceiver apparatus to the server;

code for transmitting event data for executing an event of the game to the data transceiver apparatus when the execution of the game is reported to the server;

code for executing the event of the game based on the event data, and generating motion data based on a motion of the data transceiver apparatus detected by the motion sensor during execution of the event, the motion data indicating how a user moves the data transceiver apparatus;

code for generating excitement level data based on the motion data by at least one of the server and the data transceiver apparatus, the excitement level data indicating excitement level of a user, code for generating statistic of the excitement level data by the server;

code for receiving the statistic from the sever by the data transceiver apparatus; and code for displaying the statistic on the data transceiver apparatus.

9. A method for controlling a game system with a server and a game transceiver apparatus having a motion sensor and an image display unit, the method comprising:

reporting execution of the game by the data transceiver apparatus to the server;

transmitting event data for executing an event of the game to the data transceiver apparatus when the execution of the game is reported to the server;

executing the event of the game based on the event data, and generating motion data based on a motion of the data transceiver apparatus detected by the motion sensor during execution of the event, the motion data indicating how a user moves the data transceiver apparatus;

generating excitement level data based on the motion data by at least one of the server and the data transceiver apparatus, the excitement level data indicating excitement level of a user, generating statistic of the excitement level data by the server;

receiving the statistic from the server by the data transceiver apparatus; and displaying the statistic on the data transceiver apparatus.

* * * * *